J. DUNCAN & W. H. ARNOLD.
Hub-Boring Machines.

No. 141,264. Patented July 29, 1873.

Witnesses:

Inventor:
J. Duncan
W. H. Arnold
Per
Attorneys.

UNITED STATES PATENT OFFICE.

JAMES DUNCAN AND WILLIAM H. ARNOLD, OF BUCHANAN, MICHIGAN.

IMPROVEMENT IN HUB-BORING MACHINES.

Specification forming part of Letters Patent No. 141,264, dated July 29, 1873; application filed May 5, 1873.

*To all whom it may concern:*

Be it known that we, JAMES DUNCAN and WM. HENRY ARNOLD, of Buchanan, in the county of Berrien and State of Michigan, have invented a new and Improved Hub-Boring Machine, of which the following is a specification:

The invention consists in the improvement of hub-boring machines, as hereinafter described and pointed out in the claims.

Figure 1:
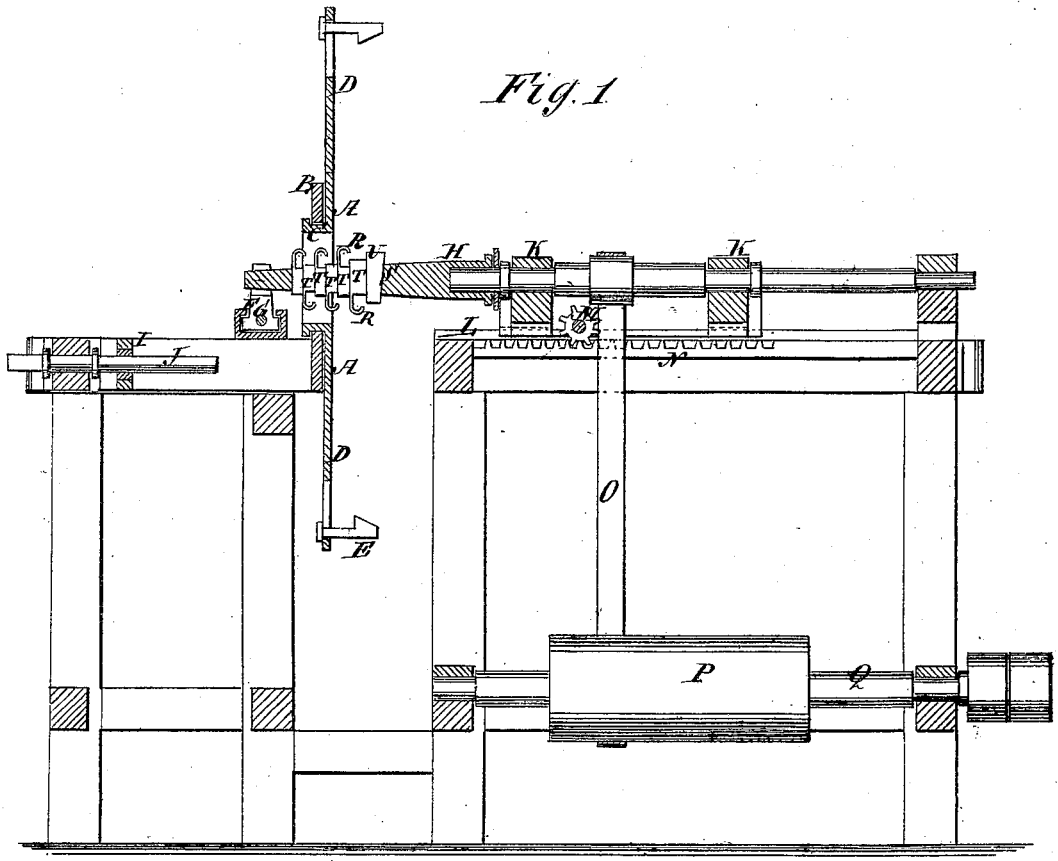
Figure 2:
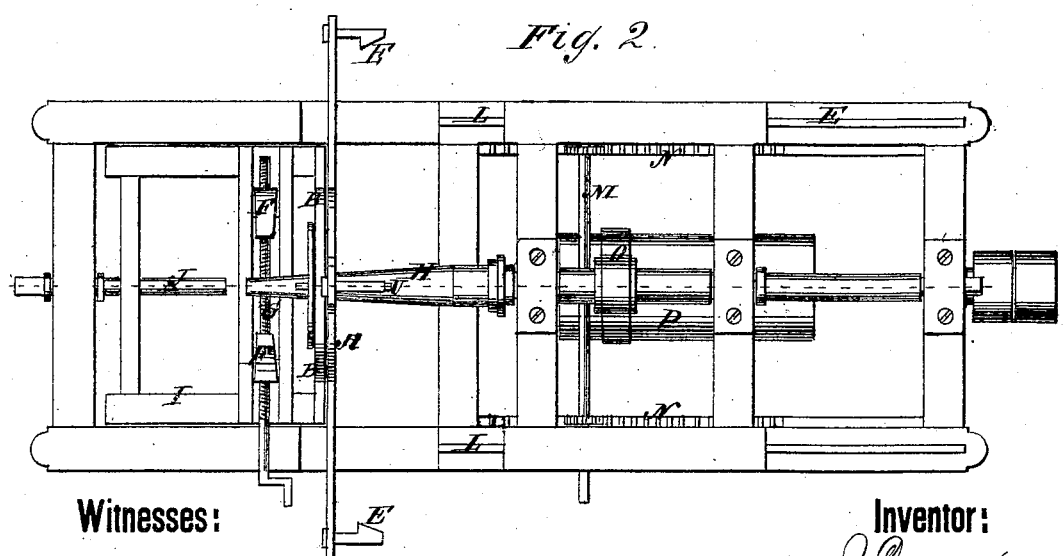

Figure 1 is a longitudinal sectional elevation of our improved machine. Fig. 2 is a plan view.

A is the wheel for centering and holding the wagon-wheel whose hub is to be bored. It is mounted in the bearing B, so as to revolve in a vertical plane, and has a large central hole, C, for the hub, also radial arms D, to which the rim is to be clipped by holders E, so as to hold the hub in the hole. The small end of the hub projects through the wheel A to the right and extends between the sliding centering jaws F, which are drawn up against the sides of the hub by the right-and-left screw G, so as to line the hub with the boring-mandrel H before it is fastened to the arms by the clips.

Two opposite sides of the wheel are first adjusted and fastened, then the wheel A is turned a quarter of a revolution, and the intermediate two points are adjusted and fastened. The wheel A may be turned slowly while the hub is boring, as a further means of insuring accuracy in boring.

The jaws F are mounted on a frame, I, which slides toward and from the wheel A, to adjust them to hubs of different lengths. The frame is adjusted by a screw, J. The boring-mandrel is mounted on a carriage, K, which slides toward and from the wheel A on the ways L, being moved by a hand-crank shaft, M, mounted on it and gearing with the toothed bars N, or it may be worked by a screw, if preferred. The mandrel is revolved by a belt, O, worked by a long drum, P, on the driving-shaft Q, which allows the belt to run along with the mandrel as it moves forward and backward.

The part of the mandrel which carries the cutters R is tapered to correspond with the taper of the holes to be bored, or thereabout, and has a long slot, S, in which the shanks T of a series of cutters are secured by a key, U, as shown, and in practice a set-screw will be combined with the key to fasten it.

The cutters are alternately reversed, as shown, to cut on opposite sides of the mandrel, to divide and balance the pressure.

In practice, the cutters will be a half-inch wide, and twice as many will be used as the number of inches in the length of the box, so that as the boxes vary in length by half-inches the cutters can be varied to correspond by putting in or taking out one or more, so that a true taper and the exact size required can always be insured by having the combined cutters the same length as the box, setting the cutters for the size required and then having the mandrel move the right distance into the hub.

By setting the end cutters the right distance from the axis of the mandrel the others can be properly adjusted by a straight-edge.

The last cutter entering the hub will be fed into it far enough beyond the end to cut the cylindrical socket or recess for the collar of the box.

Having thus described our invention, we claim as new and desire to secure by Letters Patent—

1. The combination of the adjusting-jaws F and screw G with the wheel A, substantially as specified.

2. The said jaws F and screw G, mounted on a frame, I, adjustable toward and from wheel A, substantially as specified.

3. The mandrel H, reciprocating frame K, driving-belt O, and long drum P, combined and arranged substantially as specified.

JAMES DUNCAN.
WILLIAM HENRY ARNOLD.

Witnesses:
GEORGE A. HARRIS,
M. H. SMITH.